(12) United States Patent
Gajiwala et al.

(10) Patent No.: US 11,995,241 B1
(45) Date of Patent: May 28, 2024

(54) SYSTEM AND METHOD OF A MODULAR SEAMLESS HAPTIC TOUCHPAD ASSEMBLY AND METHOD OF MANUFACTURE OF THE MODULAR SEAMLESS HAPTIC TOUCHPAD

(71) Applicant: Dell Products, LP, Round Rock, TX (US)

(72) Inventors: Priyank J. Gajiwala, Austin, TX (US); Trevor R. Todd, San Antonio, TX (US); Charles Hughes, Round Rock, TX (US); Wu Chin-Chung, Yonghe Dist (TW); Robert D. Hrehor, Jr., Round Rock, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 18/229,809

(22) Filed: Aug. 3, 2023

(51) Int. Cl.
  *G06F 3/01* (2006.01)
  *G06F 3/0354* (2013.01)
  *G06F 3/044* (2006.01)

(52) U.S. Cl.
  CPC .......... *G06F 3/016* (2013.01); *G06F 3/03547* (2013.01); *G06F 3/044* (2013.01); *G06F 2203/04103* (2013.01)

(58) Field of Classification Search
  CPC ...... G06F 3/016; G06F 3/03547; G06F 3/044; G06F 2203/04103
  See application file for complete search history.

(56) References Cited

U.S. PATENT DOCUMENTS

| | | | |
|---|---|---|---|
| 10,775,850 B2 | 9/2020 | Wang |
| 10,775,889 B1 | 9/2020 | Lehmann |
| 11,409,332 B2 | 8/2022 | Wang |
| 11,484,267 B2 | 11/2022 | Shui |
| 11,487,362 B1 | 11/2022 | Lehmann |
| 2009/0066673 A1 | 3/2009 | Molne |
| 2010/0045612 A1 | 2/2010 | Molne |
| 2017/0344115 A1 | 11/2017 | Ji |
| 2021/0240282 A1 | 8/2021 | Gajiwala |
| 2021/0263610 A1 | 8/2021 | Yang |
| 2021/0349540 A1 | 11/2021 | Knoppert |
| 2021/0390164 A1 | 12/2021 | Knoppert |

(Continued)

*Primary Examiner* — Michael Pervan
(74) *Attorney, Agent, or Firm* — Prol Intellectual Property Law, PLLC; H. Kenneth Prol

(57) ABSTRACT

An apparatus and method of manufacture for a modular seamless touchpad assembly comprising a seamless glass layer extending to a plurality of palm rest surfaces formed over a touchpad support bracket that extends across a top cover of a base chassis of an information handling system and including a touchpad printed circuit board assembly (PCBA) and a haptic actuator array coupled between the touchpad PCBA and the touchpad support bracket for generating haptic user feedback. The touchpad support bracket is formed under the haptic actuator array to support the modular seamless touchpad assembly as an installable hardware module to modularly fit within a touchpad opening formed in the top cover of the base chassis and a connector port to operatively couple a haptic touchpad controller with a reciprocal connector in the touchpad opening such that the modular seamless touchpad assembly is testable via the connector port before installation.

20 Claims, 9 Drawing Sheets

(56) References Cited

U.S. PATENT DOCUMENTS

2022/0236810 A1   7/2022  Gajiwala
2022/0365566 A1   11/2022 Wang
2023/0018184 A1   1/2023  Lehmann
2023/0266829 A1*  8/2023  Sathe ................. G06F 3/03547
                                                        345/168

* cited by examiner

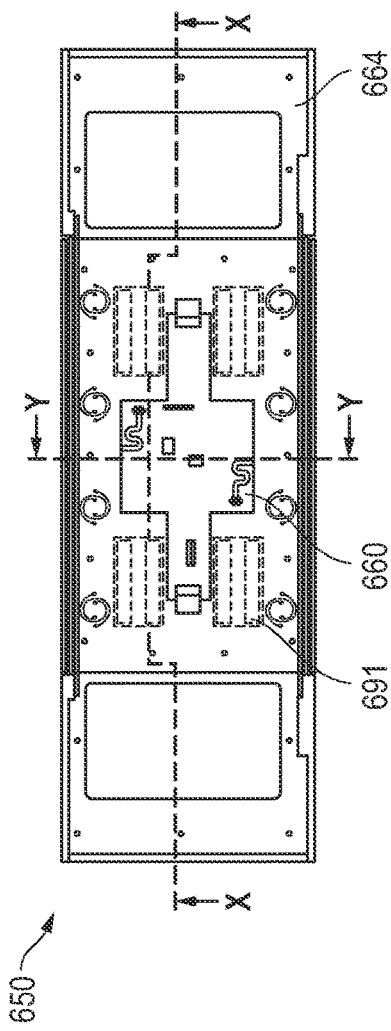
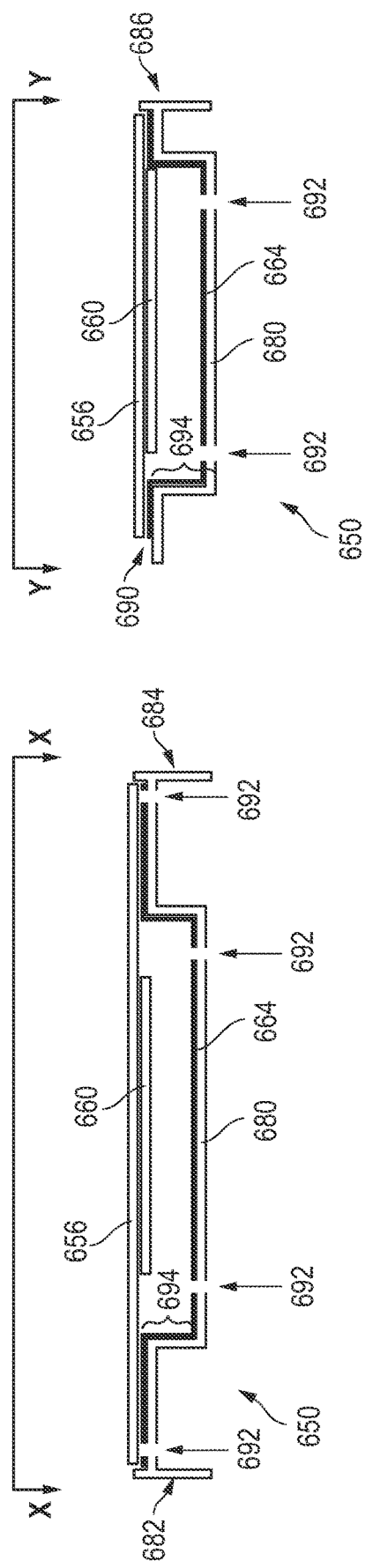
FIG. 6A
FIG. 6B
FIG. 6C

SYSTEM AND METHOD OF A MODULAR SEAMLESS HAPTIC TOUCHPAD ASSEMBLY AND METHOD OF MANUFACTURE OF THE MODULAR SEAMLESS HAPTIC TOUCHPAD

FIELD OF THE DISCLOSURE

The present disclosure generally relates to a haptic touchpad. More specifically, the present disclosure relates to a modular seamless haptic touchpad assembly that is modularly couplable to a touchpad opening formed in a housing of the information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include one or more input devices incorporated within a base chassis, including a keyboard and touchpad, for example.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 6A is a graphical diagram illustrating a bottom view of a modular seamless haptic touchpad assembly according to another embodiment of the present disclosure;

FIG. 6B is a graphical diagram illustrating a cross-sectional front view of a modular seamless haptic touchpad assembly according to another embodiment of the present disclosure;

FIG. 6C is a graphical diagram illustrating a cross-sectional side view of a modular seamless haptic touchpad assembly according to another embodiment of the present disclosure;

The use of the same reference symbols in different drawings may indicate similar or identical items.

DETAILED DESCRIPTION OF THE DRAWINGS

Figure 1:
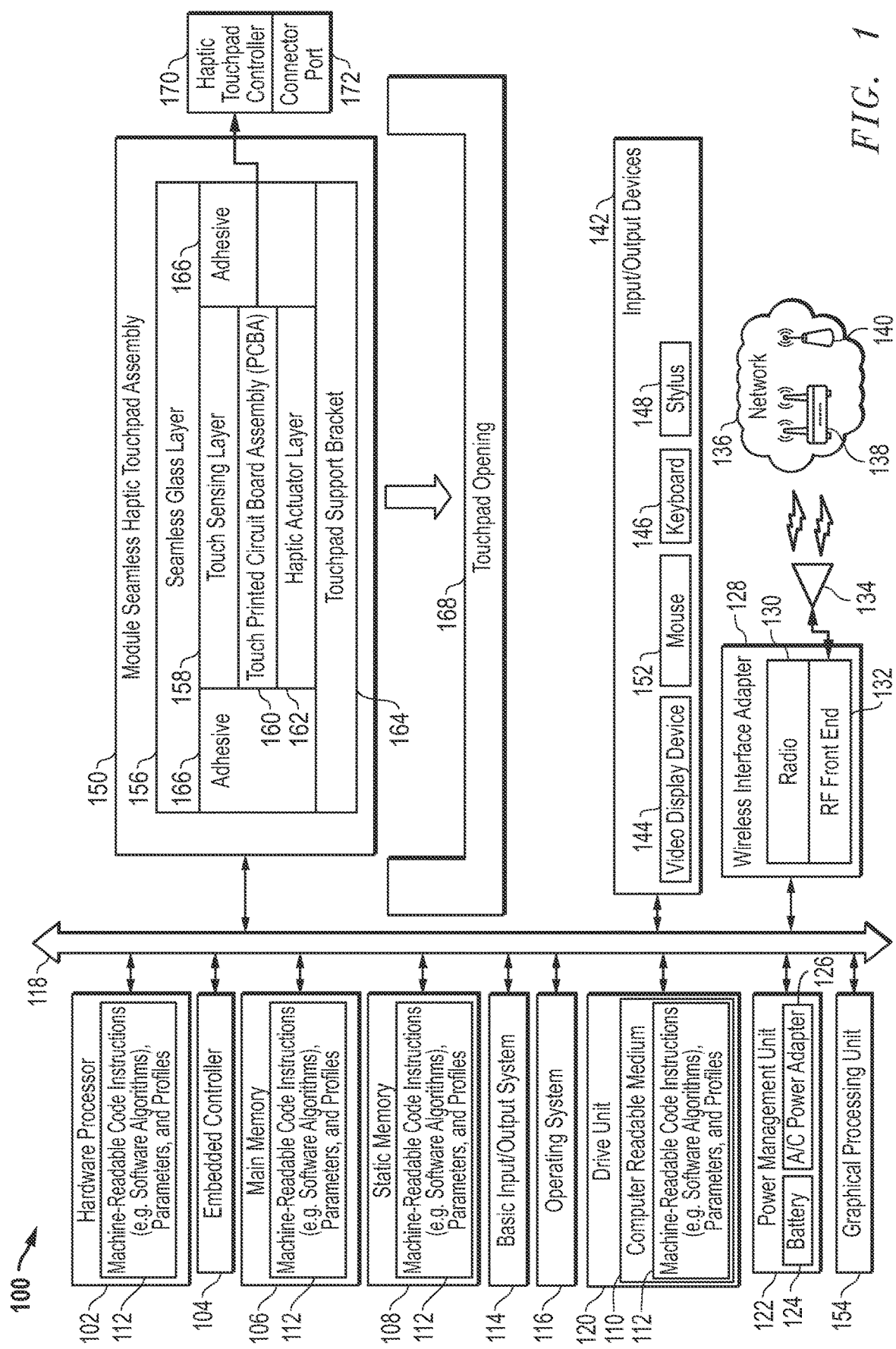
FIG. 1 is a block diagram illustrating an information handling system operably coupled to a modular seamless haptic touchpad assembly according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems, such as notebook, tablet, and laptop computers may include a display chassis housing the video display screen, and a base chassis housing a keyboard, touchpad, and various internal components necessary for operation of the information handling system, such as processors, memory, buses, and network interface devices, for example. The base chassis may be operatively coupled to the display chassis via a hinge in example embodiments. The base chassis for such information handling systems may include an upper portion where the keyboard and touchpad may be situated and accessible by the user, and a bottom portion that mates with the upper portion to enclose the various operational components (e.g., hardware processor, memory, etc.). Many conventional base chasses are manufactured by inserting a keyboard and a touchpad into openings formed through the upper portion of the base chassis, such that the keyboard and touchpad may be built therein and affixed to the base chassis before the systems are tested. However, because the touchpad must be built into the base chassis, often with a window in palm rests for the touchpad the ability to swap out the touchpad if a defect is detected, even on the manufacturing floor, is limited and may result in the need to rebuild or throw out the entire base chassis. This is because the adhesives used to secure the touchpad to the body of the base chassis make removal of the touchpad difficult and, when attempted, may result in damage to other components and chassis of the information handling system. Furthermore, the touchpad of prior system is designed and manufactured specifically for a particular model of information handling system base chassis for installation in the touchpad window and with one more components or communication ports located or arranged to accommodate other components within the information handling system base chassis. This makes sourcing different vendor manufactured touchpads difficult since specification may vary slightly and create issues in manufacturing. Additionally, different types of haptic actuation systems used with haptic touchpads may be difficult to accommodate in existing systems.

The present specification describes a modular seamless haptic touchpad assembly that is easily tested prior to installation into the base chassis of the information handling system and modular to accommodate different haptic actuation technologies and different suppliers. Further, later repairs, when necessary, are easily accomplished due to the modularity of the modular seamless haptic touchpad assembly described herein enabling preservation or continued lifespan of use for information handling systems. Specifically, the present specification describes a modular seamless haptic touchpad assembly for an information handling system that includes a seamless glass layer forming a top layer of a touchpad and extending to a plurality of palm rest support surfaces formed over a touchpad support bracket to extend across a top cover of a base chassis when installed in the information handling system. A touch sensing layer is adhesively coupled to a bottom surface of the seamless glass layer to detect a touch from a user during operation of the touchpad after installation of the modular seamless haptic touchpad assembly within the base chassis of the information handling system. A touchpad printed circuit board assembly (PCBA) is operatively coupled to a bottom surface of the touch sensing layer and a haptic actuator array is coupled between a bottom surface of the PCBA and the touchpad support bracket for generating haptic user feedback to a user of the touchpad. In an embodiment, the touchpad support bracket is formed under the haptic actuator array to support the modular seamless haptic touchpad assembly, including palm rest side areas, as an installable hardware module. The touchpad support bracket of the modular seamless haptic touchpad assembly is formed to modularly fit as the installable hardware module within a touchpad opening formed in the top cover of the base chassis of the information handling system. A connector port is formed to operatively couple a haptic touchpad controller with a reciprocal connector in the touchpad opening formed in the top cover of the base chassis. In this way, the modular seamless touchpad assembly is testable as the installable hardware module via the connector port before installation in the top cover of the base chassis or easily swapped if tested while installed. In an embodiment, the touchpad support bracket is mechanically and operatively couplable within the base chassis of the information handling system via fasteners disposed through the base chassis of the information handling system and into receiver openings along the sides of the touchpads support bracket according to embodiments herein.

In an embodiment, the touch sensing layer is a capacitive sensor array sensing capacitive touch in the touchpad assembly underneath the seamless glass layer and operatively coupled to the haptic touchpad controller to control actuation of a haptic device in the haptic actuator array. Further, in some embodiments, the haptic actuator array includes an array of piezoelectric haptic devices mounted on holes in the touchpad support bracket under a touchpad zone in the seamless glass layer of the seamless touchpad assembly for generating the haptic user feedback. The haptic actuator array of piezo electric haptic device is operatively coupled to the touchpad PCBA to sense actuation by a user at the touchpad zone on the seamless glass layer forming the top layer of the touchpad and provide haptic user feedback to the touchpad zone. In another embodiment, the haptic actuator array includes an array of inductive coils formed in the touchpad PCBA that interface with an array of magnets and mounted to a top surface of the touchpad support bracket to generate the haptic user feedback at the seamless glass layer forming the top layer of the touchpad when a current is applied to the array of inductive coils interfacing with the array of magnets.

In an embodiment, the touchpad PCBA includes a flexible PCBA for the haptic feedback to pass through the flexible PCBA and into the seamless glass layer, the touchpad PCBA including the haptic touchpad controller to control a current passed to the haptic actuator array to generate the haptic user feedback with at least one haptic actuator. In another embodiment, a plurality of silicone spacers on the touchpad support bracket to provide for an interaction space between the array of magnets operatively coupled to the array of inductive coils.

The modularity of the modular seamless haptic touchpad assembly, therefore, allows for a manufacturer to manufacture the modular seamless haptic touchpad assembly sourced from multiple possible vendors with specifications for the touchpad stack and with a plurality of types of haptic actuator array prior to assembly into a top cover of the base chassis of the information handling system. The modular seamless haptic touchpad assembly may be of a uniform dimension in the touchpad support bracket and seamless glass layer to allow various vendors or haptic actuator array technologies to be used in the same information handling system touchpad opening. This also allows the manufacturer to test the modular seamless haptic touchpad assembly prior to assembly into the top cover of the base chassis of the information handling system in an embodiment. Still further, where a defective modular seamless haptic touchpad assembly is detected during this process, the defective modular seamless haptic touchpad assembly may be thrown out or sent back for repairs rather than being installed permanently into the base chassis of the information handling system. Even further, where the modular seamless haptic touchpad assembly becomes defective after use by a consumer, for example, the replacement of the modular seamless haptic touchpad assembly is relatively easier due to the modularity of the modular seamless haptic touchpad assembly and may extend the usable life of other components of the information handling system.

FIG. 1 illustrates an information handling system 100 according to several aspects of the present disclosure. In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium that is volatile (e.g. random-access memory, etc.), nonvolatile memory (read-only memory, flash memory etc.) or any combination thereof), one or more hardware processing resources, such as a central processing unit (CPU), a graphics processing unit (GPU) 154, an embedded controller 104, a Visual Processing Unit (VPU) or a Hardware Accelerator, any one of which may be the hardware processor 102 illustrated in FIG. 1, hardware control logic, or any combination thereof. Additional components of the information handling system 100 may include one or more storage devices 106 or 108, a wireless network interface device such as a wireless interface adapter 128, one or more communications ports for communicating with external devices, as well as various input and output (I/O) devices 142, such as a mouse 152, a keyboard 146, a touchpad as part of the modular seamless haptic touchpad assembly 150 described here, or any combination thereof. A power management unit (PMU) 122 supplying power to the information handling system 100, via a battery 124 or an alternating current (A/C) power adapter 126 may supply power to one or more components of the information handling system 100, including the hardware processor 102, or other hardware processing resources executing code instructions, the wireless interface adapter 128, a static memory 108 or drive unit 120, a video display device 144, or other components of an information handling system 100. The video display device 144 in an embodiment may function as a liquid crystal display (LCD), an organic light emitting diode (OLED), a flat panel display, or a solid-state display. The information handling system 100 may also include one or more buses (e.g., 118) operable to transmit communications between the various hardware components.

The information handling system 100 may further include a modular seamless haptic touchpad assembly 150 mountable within a top cover of a base chassis of the information handling system 100, which may further incorporate a touchpad printed circuit board assembly (PCBA) 160, as also described in greater detail herein. The modular seamless haptic touchpad assembly 150 in an embodiment may further be controlled by the touchpad PCBA 160. In some embodiments, the touchpad PCBA 160 may also communicate with the hardware processor 102 in order to relay input data to the hardware processor 102.

In an embodiment, the top surface panel of the modular seamless haptic touchpad assembly 150 in an embodiment may comprise a substrate such as glass with a seamless glass layer 156 that provides a touchpad interface surface as well as a plurality of palm rest surfaces on each side of the touchpad interface surface. A touchpad support bracket 164 supports under the entire seamless glass layer including the touchpad interface surface and plurality of palm rest surfaces to provide rigidity and protection for the modular seamless haptic touchpad assembly 150 during shipping, testing, installation, or handling. In an embodiment, the top surface seamless glass layer 156 of the modular seamless haptic touchpad assembly 150 may comprise a substrate of composite substrate of woven glass fiber impregnated with polycarbonate material to provide sufficient stiffness for operation of the modular seamless haptic touchpad assembly 150 and a durable, aesthetically pleasing glass-like finish.

The information handling system 100 may execute machine-readable code instructions, parameter, and profiles 112, via one or more hardware processing resources, that may operate on servers or systems, remote data centers, or on-box in individual client information handling systems 100 according to various embodiments herein. In some embodiments, it is understood any or all portions of machine-readable code instructions, parameter, and profiles 112 may operate on a plurality of information handling systems 100.

The information handling system 100 may include a hardware processor 102 such as a central processing unit (CPU), a graphics processing unit (GPU) 154, a Visual Processing Unit (VPU), an embedded controller (EC) 104, or a hardware accelerator, embedded controllers or hardware control logic or some combination of the same. Any of the hardware processing resources may operate to execute code that is either firmware or software code. Moreover, the information handling system 100 may include memory such as main memory 106, static memory 108, containing computer readable medium storing machine-readable code instructions, parameter, and profiles 112. In other embodiments the information handling system 100 may represent a server information handling system executing operating system (OS) software, application software, BIOS software, or other software applications or drivers detectable by hardware processor type.

The disk drive unit 120 and static memory 108 may also contain space for data storage in a computer readable medium 110. The machine-readable code instructions, parameter, and profiles 112 in an embodiment may reside completely, or at least partially, within the main memory 106, the static memory 108, and/or within the disk drive 120 during execution by the hardware processor 102. The information handling system 100 may also include one or more buses 118 operable to transmit communications between the various hardware components such as any combination of various input and output (I/O) devices 142, the modular seamless haptic touchpad assembly 150, the keyboard 146, mouse 152, stylus 148, or the like.

The wireless interface adapter 128 may provide connectivity of the information handling system 100 to the network 136 via a network access point (AP) 138 in an embodiment. The network 136 in some embodiments may be a wired local area network (LAN), a wireless personal area network (WPAN), a public Wi-Fi communication network, a private Wi-Fi communication network, a public WiMAX communication network, or other non-cellular communication networks. In other embodiments, the network 136 may be a wired wide area network (WAN), a 4G LTE public network, or a 5G communication network, or other cellular communication networks. In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein. Various software modules comprising application instructions 112 may be coordinated by an operating system (OS), and/or via an application programming interface (API). An example operating system may include Windows®, Android®, and other OS types. Example APIs may include Win 32, Core Java API, or Android APIs. Application instructions 112 may also include any application processing drivers, or the like executing on information handling system 100.

Main memory 106 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The machine-readable code instructions, parameter, and profiles 112 may be stored in static memory 108, or the drive unit 120 on a computer-readable medium 110 such as a flash memory or magnetic disk in an example embodiment.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® brand hardware processor, ARM® brand hardware processors, Qualcomm® brand hardware processors, or other hardware processors and chipsets, or other such device, or software capable of operating a relevant environment of the information handling system. The hardware system, hardware device, hardware controller, or hardware module may also comprise a combination of the foregoing examples of hardware, or hardware processors executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

As described herein, the information handling system 100 includes a modular seamless haptic touchpad assembly 150. The modular seamless haptic touchpad assembly 150 may include a number of devices and layers that form, at least in part, a touchpad used by a user to provide input into the information handling system 100. In an embodiment, the modular seamless haptic touchpad assembly 150 includes the seamless glass layer 156 described herein as a layer the user touches during operation. In an embodiment, the seamless glass layer 156 may be wide enough to include side palm rest areas and to reach from one side of the base chassis of the information handling system 100 to the other side of the base chassis thereby creating a single piece across a front portion of the information handling system 100 with the modular seamless haptic touchpad assembly 150.

In an embodiment, the modular seamless haptic touchpad assembly 150 may further include a touch sensing layer 158 adhesively coupled to a bottom surface of the seamless glass layer 156. The touch sensing layer 158 may be a capacitive touch sensing layer that detects a user's touch at and through the seamless glass layer 156 so that the user may interact with the information handling system 100. In an embodiment, the adhesive 166 may be any type of adhesive that secures the touch sensing layer 158 to the bottom or underside of the seamless glass layer 156. In an embodiment, the modular seamless haptic touchpad assembly 150 may include a force sensing layer 159, such as a strain gauge layer that detects pressure applied to the surface of the seamless glass layer 156 by the user in order to determine whether haptic feedback is to be provided by the haptic actuator array 162 described herein. In an embodiment, the force sensing layer 159, such as the strain gauge layer, is optional and may be disposed above or below the touch sensing layer 158. In other embodiments, force sensing may be achieved by the touch sensing layer 158 or by the haptic actuators such as the piezoelectric haptic actuator devices of the haptic actuator array 162.

In an embodiment, the modular seamless haptic touchpad assembly 150 may also include a touchpad printed circuit board assembly (PCBA) 160 operatively coupled to a bottom surface of the touch sensing layer. The touchpad PCBA 160 may be, in an embodiment, a flexible substrate that houses any circuitry, controllers, hardware processors, or other devices described herein in order to relay touch data received at the touch sensing layer 158 to a haptic touchpad controller 170 and relay haptic feedback signals to control the activation of a haptic actuator of the haptic actuator array 162 formed below the touchpad PCBA 160.

In an embodiment, the modular seamless haptic touchpad assembly 150 may also include a touchpad printed circuit board assembly (PCBA) 160 operatively coupled to a bottom surface of the touch sensing layer. The touchpad PCBA 160 may be, in an embodiment, a flexible substrate that houses any circuitry, controllers, hardware processors, or other devices described herein in order to relay touch data received at the touch sensing layer 158 or force data to a haptic touchpad controller 170 and relay back haptic feedback signals to control the activation of a haptic actuator of the haptic actuator array 162 formed below the touchpad PCBA 160.

In one embodiment, the haptic actuator array 162 may include an array of piezoelectric haptic devices mounted on and across holes in the touchpad support bracket formed under a touchpad zone of the modular seamless haptic touchpad assembly 150 for generating the haptic user feedback. The array of piezoelectric haptic devices may be operatively coupled to the touchpad PCBA 160 to sense actuation by a user at the touchpad zone on the seamless glass layer 156 via force detection input from the user. In an embodiment, the activation of any of the piezoelectric haptic devices within the array of piezoelectric haptic devices to generate haptic user feedback may be completed when the touchpad PCBA 160 receives force input from each piezoelectric haptic device that have received a mechanical stress. Upon receiving the force input, the haptic touchpad controller 170 on the touchpad PCBA 160 activates that piezoelectric haptic device to provide haptic feedback through to the seamless glass layer 156 for the user to detect. Thus, in the embodiment where an array of piezoelectric haptic devices is used, the touch sensing layer 158 is used to detect touch at the seamless glass layer 156, but the piezoelectric haptic devices of the haptic actuator array 162 sense the force input to define whether haptic feedback is to be provided via actuation of one or more of the array of piezoelectric haptic devices.

In another embodiment, the haptic actuator array 162 may include an array of inductive coils formed in the touchpad PCBA or on a bottom or underside of the touchpad PCBA 160 that interface with an array of magnets mounted to a top surface of the touchpad support bracket. The activation of the inductive coils causes the inductive coils to interface with the array of magnets causing the touchpad PCBA 160 (in this example embodiment, a flexible PCBA) to generate the haptic user feedback up and into the seamless glass layer. Thus, where the touch sensing layer 158 detects a touch from a user and a force sensing layer 159 detects a force input at or above a threshold, the haptic touchpad controller 170 may detect where along the surface of the seamless glass layer 156 the user has input the force to actuate the touchpad and translate that to one specific or a number of inductive coils and apply a current to specified inductive coil or coils in the array of inductive coils to magnetically interact with a magnet of the array of magnets to provide such haptic feedback.

As described herein, the touchpad support bracket 164 is formed under the haptic actuator array 162 and a touchpad area of seamless glass layer 156 as well as side palm rest areas of the seamless glass layer 156 to support the modular seamless haptic touchpad assembly 150 as an installable hardware module. In an embodiment, the touchpad support bracket 164 is formed to modularly fit within a touchpad opening 168 formed in the top cover of the base chassis of the information handling system 100. This allows for the modular seamless haptic touchpad assembly 150 to be more modular than previous systems and provide a platform for multiple touchpad vendors and types of haptic actuator arrays that is uniform and modularly fits into the touchpad opening 168. The modularity of the modular seamless haptic touchpad assembly 150, therefore, allows for a plurality of manufacturers with differing designs and specifications to manufacture the modular seamless haptic touchpad assembly 150 prior to assembly into the base chassis of the information handling system 100, but with a uniform dimension of the modular touchpad assembly 150. In particular, the touchpad support bracket 164 and seamless glass layer 156 may be of a uniform dimension to provide a seamless touchpad and palm rest across the base chassis with the modular haptic touchpad assembly 150 in the touchpad opening 168 of the base chassis. This also allows the manufacturer to test the operation of the modular seamless haptic touchpad assembly 150 prior to assembly into the base chassis of the information handling system 100. Still further, where a defective modular seamless haptic touchpad assembly 150 is detected during this process, the defective modular seamless haptic touchpad assembly 150 may be thrown out or sent back for repairs rather than being installed into the base chassis of the information handling system 100. Even further, where the modular seamless haptic touchpad assembly 150 becomes defective after use by a consumer, for example, the replacement of the modular seamless haptic touchpad assembly 150 is relatively easier due to the modularity of the modular seamless haptic touchpad assembly 150 thus extending life of the remainder of the information handling system 100.

Figure 2:
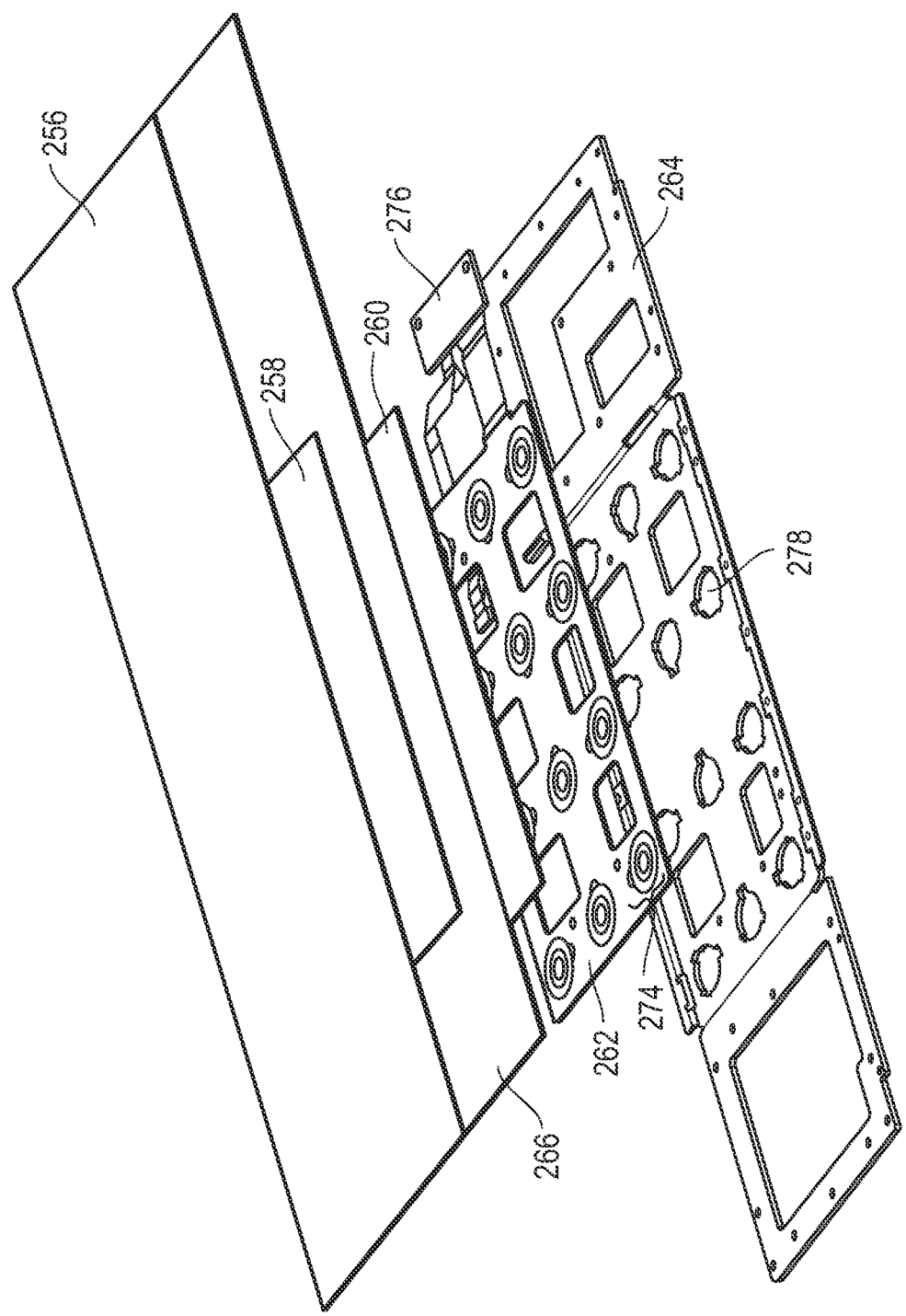
FIG. 2 is a perspective exploded view of a modular seamless haptic touchpad assembly according to an embodiment of the present disclosure.

FIG. 2 is a perspective exploded view of a modular seamless haptic touchpad assembly 250 according to an embodiment of the present disclosure. The modular seamless haptic touchpad assembly 250 depicted and described in FIG. 2 is a piezoelectric device-actuated modular seamless haptic touchpad assembly 250 that includes a haptic actuator array 262 that includes a plurality of piezoelectric devices 274.

The modular seamless haptic touchpad assembly 250 includes a seamless glass layer 256. The seamless glass layer 256 may be a substrate such as glass that is seamless and that provides a touchpad interface surface as well as a plurality of palm rest surfaces on each side of the touchpad interface surface for across a base chassis of an information handling system when installed. A touchpad support bracket 264 supports under the entire seamless glass layer 256 including the touchpad interface surface and plurality of palm rest surfaces to provide rigidity and protection for the modular seamless haptic touchpad assembly 250 during shipping, testing, installation, or handling. The touchpad support bracket 264 has side portions for supporting the palm rest surfaces on the seamless glass layer 256. The touchpad support bracket 264 has a center portion formed to accommodate the thicker touchpad stack up layers including the PCBA 260 with the haptic actuator array 262. In an embodiment, the top surface seamless glass layer 256 of the modular seamless haptic touchpad assembly 250 may comprise a substrate of composite substrate of woven glass fiber impregnated with polycarbonate material to provide sufficient stiffness for operation of the modular seamless haptic touchpad assembly 250 and a durable, aesthetically pleasing glass-like finish.

The modular seamless haptic touchpad assembly 250, in an embodiment, may further include a touch sensing layer 258 adhesively coupled to a bottom surface of the seamless glass layer 256. The touch sensing layer 258 may be a capacitive touch sensing layer that detects a user's touch at and through the seamless glass layer 256 so that the user may interact with the information handling system. In an embodiment, the size of the touch sensing layer 258 may define an interactive area of the modular seamless haptic touchpad assembly 250 where the user may provide input to the information handling system. In an embodiment, the surface area of the touch sensing layer 258 may, therefore, be smaller than the surface area of the seamless glass layer 256. In an embodiment, an adhesive 266 may be included between any layer within the modular seamless haptic touchpad assembly 250 to secure the layers or portions of the layers to each other. In the embodiment depicted in FIG. 2, the adhesive 266 may be layered below the touch sensing layer 258 to secure the touch sensing layer 258 to a lower touchpad PCBA 260 described herein as well as secure other components within the modular seamless haptic touchpad assembly 250 to the underside of the seamless glass layer 256. In an embodiment, any type of adhesive 266 that secures the touch sensing layer 258 to the bottom or underside of the seamless glass layer 256 may be used.

The modular seamless haptic touchpad assembly 250 may also include a touchpad PCBA 260. The touchpad PCBA 260 may be operatively coupled to a bottom surface of the touch sensing layer 258 via, for example, the adhesive 266 as described herein. The touchpad PCBA 260 may be, in an embodiment, a flexible substrate that houses any circuitry, controllers, hardware processors, or other devices described herein. The touchpad PCBA 260 may include that circuitry, controllers such as the touchpad haptic controller, hardware processors, and other devices in order to relay, in the embodiment depicted in FIG. 2, actuation data from each of the piezoelectric devices 274 to, for example, a hardware processor of the information handling system to provide selection data input. The touchpad PCBA 260 may be operatively coupled to a haptic PCB 276 with touchpad haptic controller operatively coupled to the touchpad PCBA 260 in order to receive this actuation data from each of the piezoelectric devices 274 when detected by the piezoelectric devices 274. In an embodiment, where any of the piezoelectric devices 274 are deflected due to the user pressing on the seamless glass layer 256 (user gesture to "select" an object), a voltage is detected. The haptic PCB 276 and the touchpad haptic controller thereon detects this voltage from one or more piezoelectric devices 274 and, in order to provide the haptic feedback, applies a voltage to the appropriate piezoelectric devices 274 in order to activate the piezoelectric devices 274. This creates the haptic feedback at the seamless glass layer 256 for the user to feel.

In the embodiment shown in FIG. 2, a piezoelectric device-actuated modular seamless haptic touchpad assembly 250 as depicted does not include a force sensing layer like other embodiments described herein. Instead, in order to detect the force applied to the surface of the seamless glass layer 256 by a user, the deflection of each of the piezoelectric devices 274 of an array of piezoelectric devices 274 on the haptic actuator array 262 serves to detect the deflection. Thus, in an embodiment, the touch sensing layer 258 and the haptic actuator array 262, via the haptic PCB 276 with touchpad haptic controller, provides both touch input and selection input to a hardware processor of the information handling system. In an embodiment, one or both of the touchpad PCBA 260 and the haptic PCB 276 with touchpad haptic controller may include a connector that operatively couples the modular seamless haptic touchpad assembly 250 to the hardware processor of the information handling system when the modular seamless haptic touchpad assembly 250 is installed within the housing (e.g., base chassis) of the information handling system. In an embodiment, the connector(s) may also be used to test the operation of the modular seamless haptic touchpad assembly 250 prior to the modular seamless haptic touchpad assembly 250 being installed within the housing of the information handling system as described herein.

The modular seamless haptic touchpad assembly 250 also includes the touchpad support bracket 264 to provide structure and stability for the seamless glass layer 256 and other layered components and the palm rest surfaces such that the modular seamless touchpad assembly 250 is a contained, installable hardware module that may be of uniform dimension for installation. As this installable hardware module, the module seamless touchpad assembly 250 may be used with plural types of haptic touchpad arrays 262 or touchpad stack ups from various vendors. As described herein, the touchpad support bracket 264 is formed under the haptic actuator array 262 (including the array piezoelectric devices 274) and a touchpad area of seamless glass layer 256 as well as side palm rest areas of the seamless glass layer 256 to support the modular seamless haptic touchpad assembly 250 as an installable hardware module. In an embodiment, the touchpad support bracket 264 is formed to modularly fit within a touchpad opening (not shown) formed in the top cover of the base chassis of the information handling system. This allows for the modular seamless haptic touchpad assembly 250 to be more modular than previous systems and provide a platform for multiple touchpad vendors and types of haptic actuator arrays that is uniform and modularly fits into the touchpad opening. The modularity of the modular seamless haptic touchpad assembly 250, therefore, allows for a plurality of manufacturers with differing designs and specifications to manufacture the modular seamless haptic touchpad assembly 250 prior to assembly into the base chassis of the information handling system, but with a uniform dimension of the modular touchpad assembly 250. In particular, the touchpad support bracket 264 and seamless glass layer 256 may be of a uniform dimension to provide a seamless touchpad and palm rest across the base chassis with the modular haptic touchpad assembly 250 in the touchpad opening of the base chassis. This also allows the manufacturer to test the operation of the modular seamless haptic touchpad assembly 250 prior to assembly into the base chassis of the information handling system via the connector as described in FIG. 2. Still further, where a defective modular seamless haptic touchpad assembly 250 is detected during this process, the defective modular seamless haptic touchpad assembly 250 may be thrown out or sent back for repairs rather than being installed into the base chassis of the information handling system. Even further, where the modular seamless haptic touchpad assembly 250 becomes defective after use by a consumer, for example, the replacement of the modular seamless haptic touchpad assembly 250 is relatively easier due to the modularity of the modular seamless haptic touchpad assembly 250 thus extending life of the remainder of the information handling system.

The touchpad support bracket 264 in FIG. 2 further includes one or more haptic device vias 278 which are holes in the bottom of touchpad support bracket 264 for the piezoelectric devices 274. Each haptic device via 278 may be formed below each of the piezoelectric devices 274 formed on the haptic actuator array 262 to that the piezoelectric devices 274 set into the vias 278 and are supported by the edges of the vias 278. This allows the piezoelectric devices 274 to be supported on the touchpad support bracket 264 and to move to create the haptic feedback as described herein. Additionally, a top center portion of each of the piezoelectric devices 274 may include an adhesive 266 that secures a center portion of the piezoelectric devices 274 to an upper surface such as the bottom surface of the touchpad PCBA 260. This allows the piezoelectric device 274 to be deflected when a user presses down on the surface of the seamless glass layer 256 as well as allows the haptic movement of each of the piezoelectric devices 274 to be transmitted through the remaining layers of the modular seamless haptic touchpad assembly 250 in order to be felt by the user at the top surface of the seamless glass layer 256.

Figure 3A:
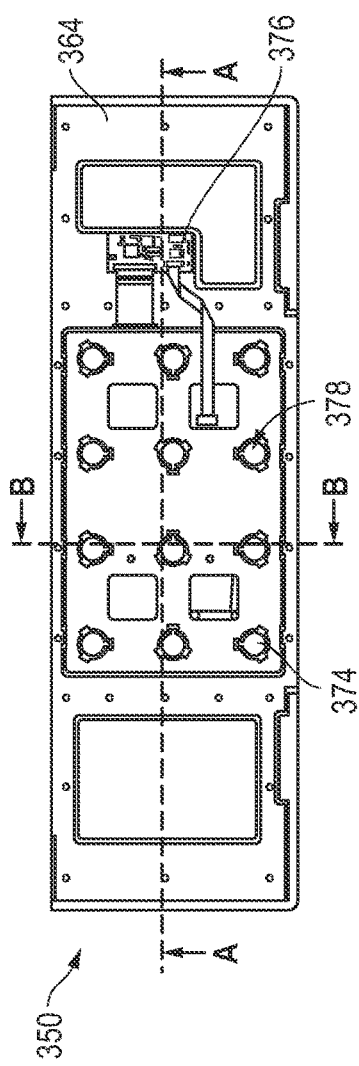
FIG. 3A is a graphical diagram illustrating a bottom view of a modular seamless haptic touchpad assembly according to an embodiment of the present disclosure.
Figure 3C:
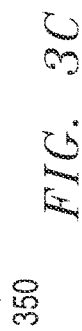
FIG. 3C is a graphical diagram illustrating a cross-sectional side view of a modular seamless haptic touchpad assembly according to an embodiment of the present disclosure.
Figure 3B:
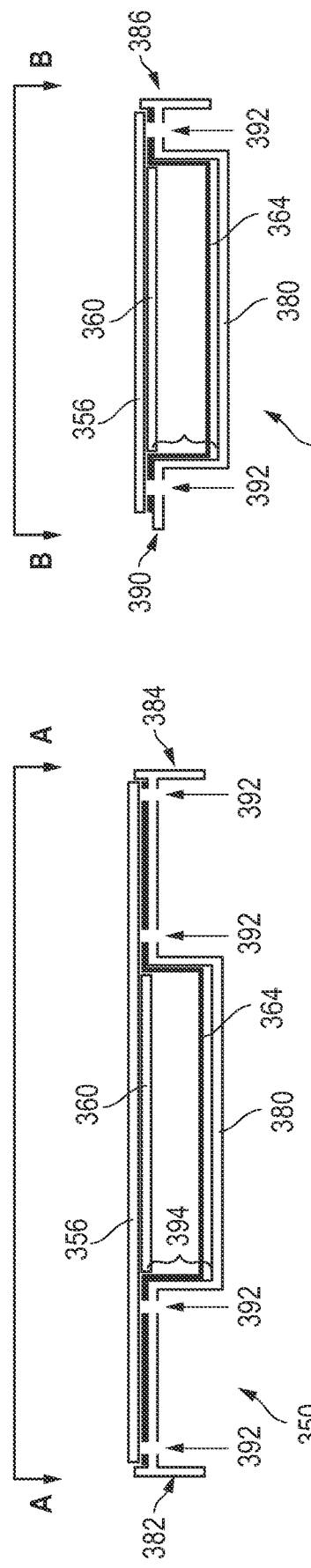
FIG. 3B is a graphical diagram illustrating a cross-sectional front view of a modular seamless haptic touchpad assembly according to an embodiment of the present disclosure.

FIG. 3A is a graphical diagram illustrating a bottom view of a modular seamless haptic touchpad assembly 350 according to an embodiment of the present disclosure. Further, FIG. 3B is a graphical diagram illustrating a cross-sectional front view of a modular seamless haptic touchpad assembly 350 according to an embodiment of the present disclosure. Still further, FIG. 3C is a graphical diagram illustrating a cross-sectional side view of a modular seamless haptic touchpad assembly 350 according to an embodiment of the present disclosure. The modular seamless haptic touchpad assembly 350 depicted in FIGS. 3A, 3B, and 3C may be similar to the modular seamless haptic touchpad assembly 350 described in FIG. 2.

Turning to FIG. 3A, the bottom side of the modular seamless haptic touchpad assembly 350 shows example locations of each of the piezoelectric devices 374 formed within a haptic actuator array. The piezoelectric devices 374 are viewable because of the inclusion of haptic device vias 378 formed through the touchpad support bracket 364. Again, the haptic device vias 378 support the edges of the piezoelectric devices 374 and allow for the activation of the piezoelectric devices 374 such that they may each flex downward to detect force applied or when an activation current is applied to them via the haptic touchpad controller at the haptic PCB 376 or the touchpad PCBA (not shown) as described herein.

FIG. 3A further includes cross-sectional lines A-A and B-B depicting a cross-sectional cut depicted in FIG. 3B and FIG. 3C, respectively. Turning to FIG. 3B, a cross-sectional view along lines A-A in FIG. 3A is depicted. As described herein, the modular seamless haptic touchpad assembly 350 includes a seamless glass layer 356, a touch sensing layer (not shown), a touchpad PCBA 360, a haptic actuator array (not shown), and the touchpad support bracket 364. FIG. 3B shows that the touchpad support bracket 364 is a bent touchpad support bracket 364 or otherwise formed to conform to a touchpad opening 394 formed into a top cover of the base chassis 380. In an embodiment, the depth of the touchpad opening 394 may be sufficient such that the touchpad layers (e.g., the touch sensing layer, the touchpad PCBA 360, and the haptic actuator array) may fit therein to reduce the overall thickness of modular seamless haptic touchpad assembly 350 and the information handling system overall.

As depicted in FIGS. 3B and 3C, the modular seamless haptic touchpad assembly 350 may be secured to the touchpad opening 394 and the top cover of the base chassis 380 of the information handling system using a plurality of fasteners formed through a plurality of fastener vias 392. In an embodiment, these fasteners may include a screw, a bolt, an interference fit structure, a clipping device, or other type of fastener. The fastener vias 392 each match a via formed through the touchpad support bracket 364 such that the fasteners may pass through a bottom surface of the top cover of the base chassis 380 and into the touchpad support bracket 364 such that the touchpad support bracket 364 and the modular seamless haptic touchpad assembly 350 as a modular unit is secured to the top cover of the base chassis 380 of the information handling system.

Figure 4:
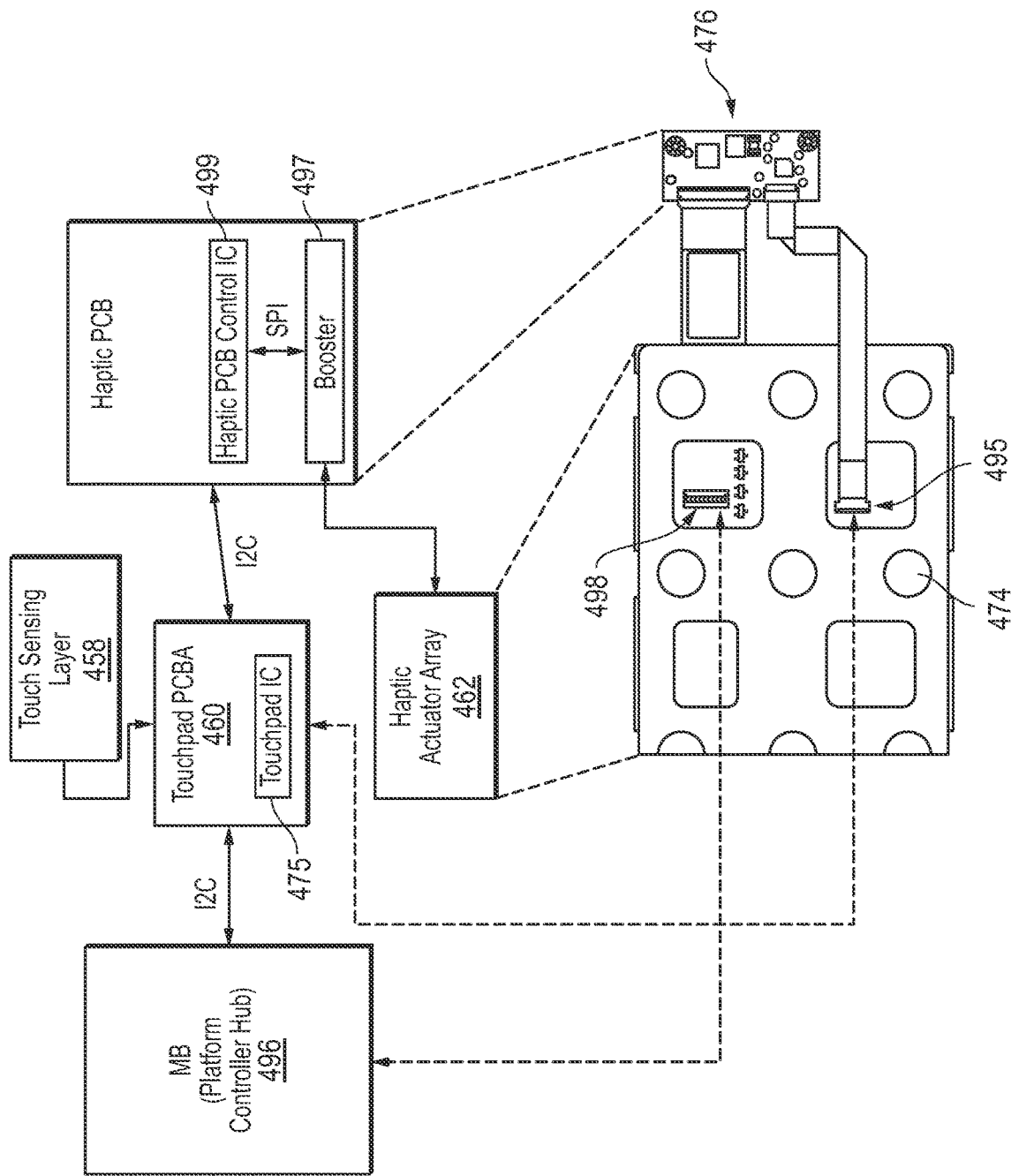
FIG. 4 is a graphical diagram illustrating top view of a modular seamless haptic touchpad assembly with a block diagram describing a circuit of the modular seamless haptic touchpad assembly interfacing with a motherboard of an information handling system according to an embodiment of the present disclosure.

FIG. 4 is a graphical diagram illustrating a modular seamless haptic touchpad assembly with a block diagram describing a circuit of the modular seamless haptic touchpad assembly interfacing with a motherboard 496 of an information handling system according to an embodiment of the present disclosure. As described herein, the haptic PCB 476 or a touchpad PCBA 460 may include a motherboard connector 498 used to operatively couple the modular seamless haptic touchpad assembly and, specifically, the haptic PCB 476 and touchpad PCBA 460 to the motherboard 496 and its platform control hub for a touchpad via a reciprocal connector in a touchpad opening formed in the top cover of the base chassis of the information handling system. The reciprocal connector in the touchpad opening formed in the top cover of the base chassis of the information handling system may operatively connect, via the respective motherboard connectors 498, any number of types of haptic actuators or touchpad stack ups from plural vendors to the motherboard 496 such that the seamless modular haptic touchpad assembly is a replaceable and installable hardware module according to embodiments herein. Further, the motherboard connectors 498 may be used such that the seamless modular haptic touchpad assembly of embodiments herein may be tested in some embodiments before installation into the information handling system.

FIG. 4 shows that the haptic PCB 476 is operatively coupled to the piezoelectric devices 474 on the haptic actuator array 462 as seen placed throughout the haptic actuator array 462. The haptic PCB 476 may also be couplable to the touchpad PCBA 460 via a haptic PCB ribbon connector 495 in order to relay actuation data to the touchpad PCBA 460 when the piezoelectric devices 474 have been deformed due to a user pressing down on a portion of the modular seamless haptic touchpad assembly.

The haptic PCB 476 may include a haptic PCB control integrated circuit (IC) 499. The haptic PCB control IC 499 may be any type of integrated circuit that receive signals from the piezoelectric devices 474, provides actuation data to the touchpad PCBA 460, and directs a voltage to be applied to the piezoelectric devices 474 to actuate the piezoelectric devices 474 thereby creating the haptic feedback at the modular seamless haptic touchpad assembly as described herein. The haptic PCB control IC 499 may otherwise be referred to herein as the touchpad haptic controller in various embodiments. The haptic PCB 476 may further include a booster 497. In an embodiment, the booster 497 may be any device that boosts the voltage provided to each of the piezoelectric devices 474. The booster 497 (also known as a flyback circuit) may increase the voltage applied to each of the piezoelectric devices 474 so that the proper amount of haptic feedback is felt by the user at the surface of the modular seamless haptic touchpad assembly.

In an embodiment, the touchpad PCBA 460 may include a touchpad IC 475. The touchpad IC 475 may be any circuitry that receives touch data from the touch sensing layer 458 as well as the actuation data from the haptic PCB 476 and, in some embodiments, may be a part of the touchpad haptic controller described herein. This data defines touch and actuations made by the user at the surface of the modular seamless haptic touchpad assembly and is used as input to the hardware processor of the information handling system (e.g., formed on the motherboard 496). The touchpad IC 475 may relay this data to the hardware processor for processing as input data accordingly.

Figure 5:
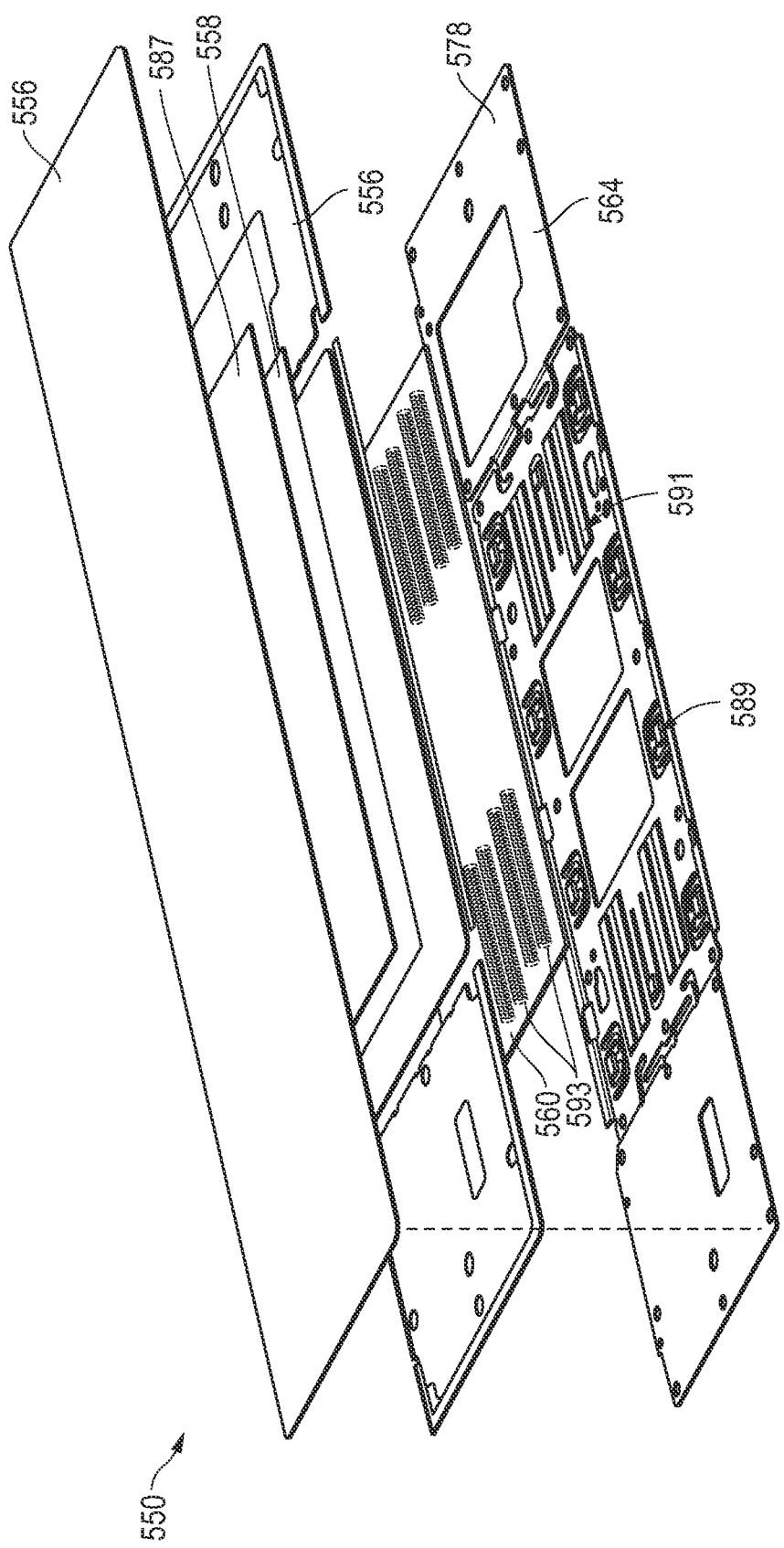
FIG. 5 is a perspective exploded view of a modular seamless haptic touchpad assembly according to another embodiment of the present disclosure.

FIG. 5 is a perspective exploded view of a modular seamless haptic touchpad assembly 550 according to another embodiment of the present disclosure. The modular seamless haptic touchpad assembly 550 depicted and described in FIG. 5 is an inductive coil-actuated modular seamless haptic touchpad assembly 550 that includes an array of inductive coils 593 formed on a bottom surface of the touchpad PCBA 560 that interact, magnetically, with an array of magnets 591 operatively coupled to a top surface of the touchpad support bracket 564.

Again, the modular seamless haptic touchpad assembly 550 includes a seamless glass layer 556. The seamless glass layer 556 may be a substrate such as glass that is seamless and that provides a touchpad interface surface as well as a plurality of palm rest surfaces on each side of the touchpad interface surface. A touchpad support bracket 564 supports under the entire seamless glass layer 556 including the touchpad interface surface and plurality of palm rest surfaces to provide rigidity and protection for the modular seamless haptic touchpad assembly 550 during shipping, testing, installation, or handling. The touchpad support bracket 564 has side portions for supporting the palm rest surfaces on the seamless glass layer 556. The touchpad support bracket 564 has a center portion formed to accommodate the thicker touchpad stack up layers including the PCBA 560 with the inductive coils 593 of the haptic actuator array. In an embodiment, the top surface seamless glass layer 556 of the modular seamless haptic touchpad assembly 550 may comprise a substrate of composite substrate of woven glass fiber impregnated with polycarbonate material to provide sufficient stiffness for operation of the modular seamless haptic touchpad assembly 550 and a durable, aesthetically pleasing glass-like finish.

The modular seamless haptic touchpad assembly 550, in an embodiment, may further include a touch sensing layer 558 adhesively coupled to a bottom surface of the seamless glass layer 556. The touch sensing layer 558 may be a capacitive touch sensing layer that detects a user's touch at and through the seamless glass layer 556 so that the user may interact with the information handling system. In an embodiment, the size of the touch sensing layer 558 may define an interactive area of the modular seamless haptic touchpad assembly 550 where the user may provide input to the information handling system. In an embodiment, the surface area of the touch sensing layer 558 may, therefore, be smaller than the surface area of the seamless glass layer 556.

In an embodiment, the modular seamless haptic touchpad assembly 550 includes a actuation sensing layer 587. The actuation sensing layer 587 may be placed above or below the touch sensing layer 558 or, in an embodiment, may be integrated into the touch sensing layer 558. In an embodiment, the actuation sensing layer 587 includes one or more pressure sensors such as stain gauges, resistive pressure sensors, or capacitive pressure sensors that detect pressure placed against the top surface of the seamless glass layer 556 by a user. This actuation is different than a simple touch as detected by the touch sensing layer 558 and the touch sensors formed on the actuation sensing layer 587 may detect a threshold level of pressure before an actuation at the seamless glass layer 556 is determined.

In an embodiment, an adhesive 566 may be included between any layer within the modular seamless haptic touchpad assembly 550 to secure the layers or portions of the layers to each other. In the embodiment depicted in FIG. 5, the adhesive 566 may be layered below the touch sensing layer 558 and/or the actuation sensing layer 587 to secure the touch sensing layer 558 and actuation sensing layer 587 to a lower touchpad PCBA 560 described herein as well as secure other components within the modular seamless haptic touchpad assembly 550 to the underside of the seamless glass layer 556. In an embodiment, any type of adhesive 566 that secures the touch sensing layer 558 and actuation sensing layer 587 to the bottom or underside of the seamless glass layer 556 may be used.

The modular seamless haptic touchpad assembly 550 may also include a touchpad PCBA 560. The touchpad PCBA 560 may be operatively coupled to a bottom surface of the touch sensing layer 558 and the actuation sensing layer 587 via, for example, the adhesive 566 as described herein. The touchpad PCBA 560 may be, in an embodiment, a flexible substrate that houses any circuitry, controllers, hardware processors, or other devices described herein. The touchpad PCBA 560 may include that circuitry, controllers such as a touchpad haptic controller, hardware processors, and other devices in order to relay, in the embodiment depicted in FIG. 5, actuation data from the actuation sensing layer 587 and touch data from the touch sensing layer 558, for example, a hardware processor of the information handling system to provide selection and movement data input.

In an embodiment, where the actuation sensing layer 587 and touch sensing layer 558 detect pressure and touch, respectively, at the surface of the seamless glass layer 556, this data is relayed to the touchpad PCBA 560 and touchpad haptic controller. The touchpad PCBA 560 with touchpad haptic controller may then cause a voltage to be applied to the appropriate inductive coils 593 formed on the bottom side of the touchpad PCBA 560. This voltage applied to the inductive coils 593 creates a magnetic field that interacts with the magnetic fields of the permanent magnets 591 operatively coupled to the top surface of the touchpad support bracket 564. This creates a repulsive or attractive force between the inductive coils 593 and magnets 591 thereby creating the haptic feedback at the seamless glass layer 556 for the user to feel.

The modular seamless haptic touchpad assembly 550 also includes a touchpad support bracket 564. As described herein, the touchpad support bracket 564 is formed under the haptic actuator array (including the inductive coils 593 and the magnets 591) as well as a touchpad area of seamless glass layer 556 and side palm rest areas of the seamless glass layer 556 to support the modular seamless haptic touchpad assembly 550 as an installable hardware module. In an embodiment, the touchpad support bracket 564 is formed to modularly fit within a touchpad opening (not shown) formed in the top cover of the base chassis (not shown) of the information handling system. This allows for the modular seamless haptic touchpad assembly 550 to be more modular than previous systems and provide a platform for multiple touchpad vendors and types of haptic actuator arrays that is uniform and modularly fits into the touchpad opening. The modularity of the modular seamless haptic touchpad assembly 550, therefore, allows for a plurality of manufacturers with differing designs and specifications to manufacture the modular seamless haptic touchpad assembly 550 prior to assembly into the base chassis of the information handling system, but with a uniform dimension of the modular touchpad assembly 550. In particular, the touchpad support bracket 564 and seamless glass layer 556 may be of a uniform dimension to provide a seamless touchpad and palm rest across the base chassis with the modular haptic touchpad assembly 550 in the touchpad opening of the base chassis. This also allows the manufacturer to test the operation of the modular seamless haptic touchpad assembly 550 prior to assembly into the base chassis of the information handling system via a connector formed on the touchpad PCBA 560 in an embodiment. Still further, where a defective modular seamless haptic touchpad assembly 550 is detected during this process, the defective modular seamless haptic touchpad assembly 550 may be thrown out or sent back for repairs rather than being installed into the base chassis of the information handling system. Even further, where the modular seamless haptic touchpad assembly 550 becomes defective after use by a consumer, for example, the replacement of the modular seamless haptic touchpad assembly 550 is relatively easier due to the modularity of the modular seamless haptic touchpad assembly 550 thus extending life of the remainder of the information handling system.

The touchpad support bracket 564 in FIG. 5 further includes a plurality of silicone spacers 589. The silicone spacers 589 may be operatively coupled to the top surface of the touchpad support bracket 564 along with the magnets 591 that are part of the haptic actuators with the inductive coils 593. The silicone spacers 589 may each have a height that sets the inductive coils 593 over the magnets 591 to form a haptic actuator such that haptic feedback can be felt at the seamless glass layer 556 by the user. For example, where the height of the silicone spacers 589 is too high, the location of the inductive coils 593 over magnets 591 may separate them such that the magnetic interaction between the magnets 591 and inductive coils 593 may not produce a sufficient haptic force to be felt by a user. The opposite is true where the location of the inductive coils 593 on the magnets 591 and may short the coil or create too much force. As such the height of the silicone spacers 589 is set so that an appropriate amount of haptic feedback is realized when the inductive coils 593 are activated and interact, magnetically, with the magnets 591.

FIG. 6A is a graphical diagram illustrating a bottom view of a modular seamless haptic touchpad assembly 650 according to another embodiment of the present disclosure. Further, FIG. 6B is a graphical diagram illustrating a cross-sectional front view of a modular seamless haptic touchpad assembly 650 according to another embodiment of the present disclosure. Still further, FIG. 6C is a graphical diagram illustrating a cross-sectional side view of a modular seamless haptic touchpad assembly 650 according to another embodiment of the present disclosure.

The modular seamless haptic touchpad assembly 650 depicted in FIGS. 6A, 6B, and 6C may be similar to the modular seamless haptic touchpad assembly 650 described in FIG. 5. Turning to FIG. 6A, the bottom side of the modular seamless haptic touchpad assembly 650 shows example locations of each of the magnets 691 formed on a top surface of the touchpad support bracket 664. The magnets 691 are placed on a top surface of the touchpad support bracket 664 to interact, magnetically, with the inductive coils formed on the touchpad PCBA 660 and together form the haptic actuator devices of the haptic actuator array as described herein in some embodiments.

FIG. 6A further includes cross-sectional lines X-X and Y-Y depicting a cross-sectional cut depicted in FIG. 6B and FIG. 6C, respectively. Turning to FIG. 6B, a cross-sectional view along lines X-X in FIG. 6A is depicted. As described herein, the modular seamless haptic touchpad assembly 650 includes a seamless glass layer 656, a touch sensing layer (not shown), an actuation sensing layer (not shown), a touchpad PCBA 660, a haptic actuator array (not shown) that includes the inductive coils and magnets described herein, and the touchpad support bracket 664. FIG. 6B shows that the touchpad support bracket 664 is a bent touchpad support bracket 664 or otherwise formed to conform to a touchpad opening 694 formed into a top cover of the base chassis 680. In an embodiment, the depth of the touchpad opening 694 may be sufficient such that the touchpad layers (e.g., the touch sensing layer, actuation sensing layer, the touchpad PCBA 660, and the haptic actuator array) may fit to reduce the overall thickness of the seamless haptic touchpad assembly as well as the thickness of the information handling system.

As depicted in FIGS. 6B and 6C, the modular seamless haptic touchpad assembly 650 may be secured to the touchpad opening 694 and the top cover of the base chassis 680 of the information handling system using a plurality of fasteners formed through a plurality of fastener vias 692. In an embodiment, these fasteners may include a screw, a bolt, a press-fit post or structure, a clipping device, or other type of fastener. The fastener vias 692 each match a via formed through the touchpad support bracket 664 such that the fasteners may pass through a bottom surface of the top cover of the base chassis 680 and into the touchpad support bracket 664 such that the touchpad support bracket 364 and the modular seamless haptic touchpad assembly 650 as a modular unit is secured to the top cover of the base chassis 680 of the information handling system.

Figure 7:
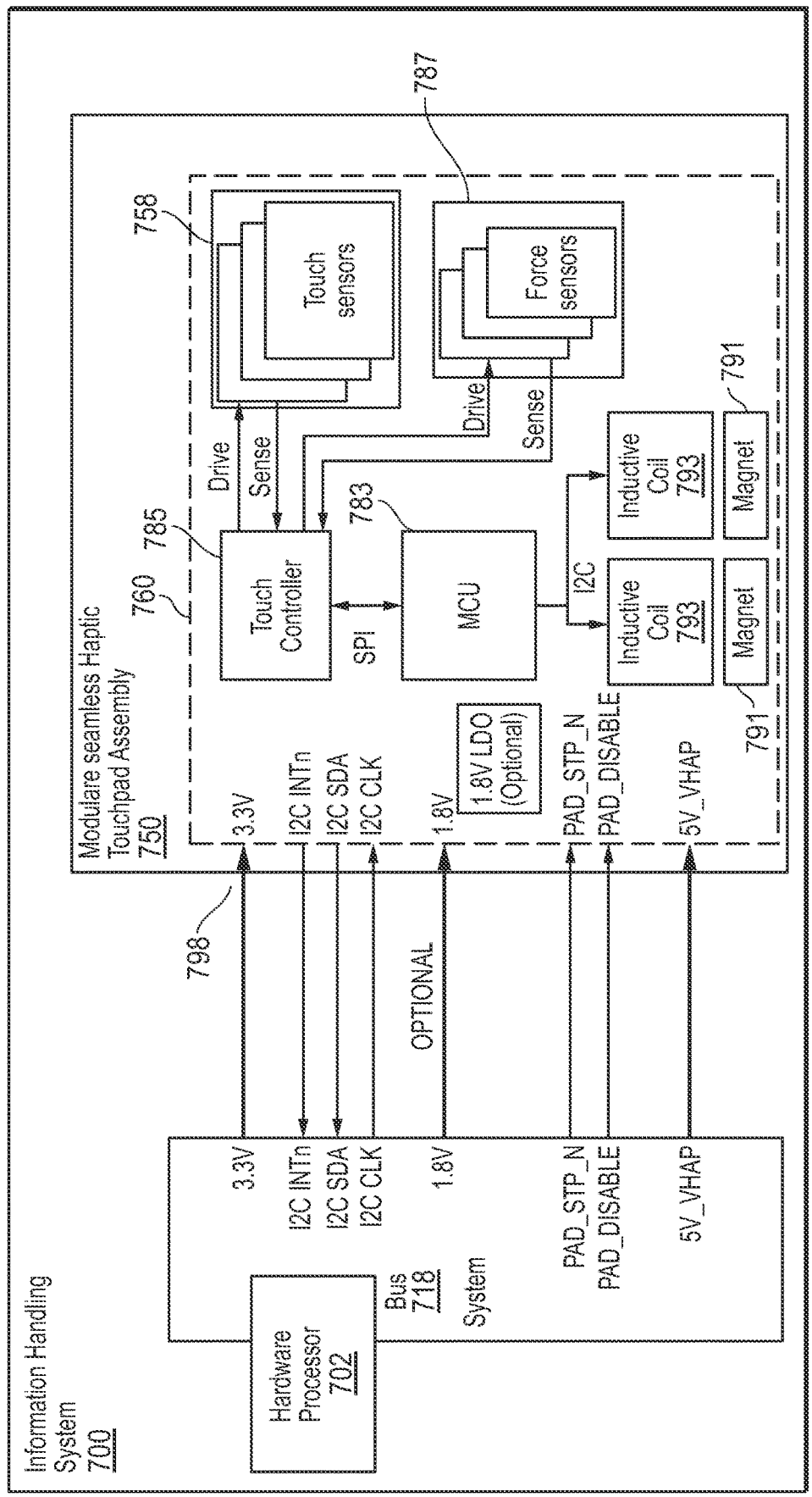
FIG. 7 is a block diagram illustrating a circuit of a modular seamless haptic touchpad assembly according to another embodiment of the present disclosure.

FIG. 7 is a block diagram illustrating a circuit of a modular seamless haptic touchpad assembly 750 according to another embodiment of the present disclosure. The circuit depicted in FIG. 7 may be formed or coupled to a touchpad PCBA 760 similar to that touchpad PCBA 660 described in connection with FIGS. 5 and 6A-6C. The modular seamless haptic touchpad assembly 750 forms a part of the information handling system 700 and is operatively coupled to the hardware processor 702 of the information handling system 700 via a bus 718 or other electrical and signal connection.

The modular seamless haptic touchpad assembly 750 includes a touchpad PCBA 760. In an embodiment, the touchpad PCBA 760 may include a flexible PCB or may include a rigid PCB. The touchpad PCBA 760 may include that circuitry used to sense actuation and touch at an actuation sensing layer 787 and touch sensing layer 758, respectively and cause a voltage to be applied to a plurality of inductive coils 793 to provide the haptic feedback as described herein. In an embodiment, a touch controller 785 may be operatively coupled to a touch sensing layer 758 that includes one or more touch sensors 779 and may be, in some embodiments herein, part of a touchpad haptic controller. In an embodiment, these touch sensors 779 may include capacitive touch sensors that detect a change in an electrical charge due to the user's finger touching or coming close to the surface of the touch sensing layer 758 and seamless glass layer. In an embodiment, the touch controller 785 may also be operatively coupled to an actuation sensing layer 787 that includes one or more force sensors 781. In an embodiment, these force sensors 781 may include strain gauges. The touch controller 785 may be responsible for providing a drive current to the touch sensors 779 and force sensors 781 as well as sensing a change at these sensors 779, 781. When the touch controller 785 senses a signal from the touch sensors 779 for example, the touch controller 785 may interpret this as the user touching the seamless glass layer at a specific location. The touch controller 785 may monitor for other sense data that indicates that the user is dragging his or her finger across the surface of the seamless glass layer in order to control the movement of a cursor for example. When the touch controller 785 senses a signal from the force sensors 781, the touch controller 785 may interpret this as the user pressing down on or actuating the seamless glass layer indicative of a user selecting an object displayed on a video display device, for example.

This data is then transmitted to a microcontroller unit (MCU) 783 formed on the touchpad PCBA 760 for the MCU 783 to provide the haptic feedback as described herein. The MCU 783 does this by interpreting the actuation data and activating one or more inductive coils 793 formed on the bottom surface of the touchpad PCBA 760. By providing a voltage to the inductive coils 793, a magnetic field is created at or near the magnets 791 formed on the touchpad support bracket as described in connection with FIG. 5. By creating this magnetic field at the inductive coils 793 an attractive or repulsive force is created between the inductive coils 793 and magnets 791. By quickly deactivating the inductive coils 793, haptic feedback is felt by the user through the seamless glass layer.

The MCU 783 is operatively coupled to the bus 718 and the hardware processor 702 via, for example, a motherboard connector 798 as described herein. This motherboard connector 798 may operatively connect the seamless haptic touchpad modular assembly to transmit the touch and actuation data at the modular seamless haptic touchpad assembly 750 for the hardware processor 702 to process and present as input data to the information handling system 700 such as movement of a cursor or selection of an object presented on a graphical user interface (GUI) presented on a video display device. The motherboard connector 798 operatively connects between the MCU 783 and the bus 718 may include one or more signal lines and power lines used to transmit data from the modular seamless haptic touchpad assembly 750 and power the devices on the modular seamless haptic touchpad assembly 750.

As described herein, the MCU 783 on the touchpad PCBA 760 may include the motherboard connector 798, shown as data and power lines to motherboard bus 718 and processor 702, used to operatively couple the modular seamless haptic touchpad assembly and, specifically, the MCU 783 and touchpad PCBA 760 to the motherboard and any platform control hub including a bus 718 for a touchpad via a reciprocal connector in a touchpad opening formed in the top cover of the base chassis of the information handling system. The reciprocal connector in the touchpad opening formed in the top cover of the base chassis of the information handling system may operatively connect, via the respective motherboard connectors 798, any number of types of haptic actuators or touchpad stack ups from plural vendors to the motherboard such that the seamless modular haptic touchpad assembly is a replaceable and installable hardware module according to embodiments herein. Further, the motherboard connectors 798 may be used such that the seamless modular haptic touchpad assembly of embodiments herein may be tested in some embodiments before installation into the information handling system.

Figure 8:
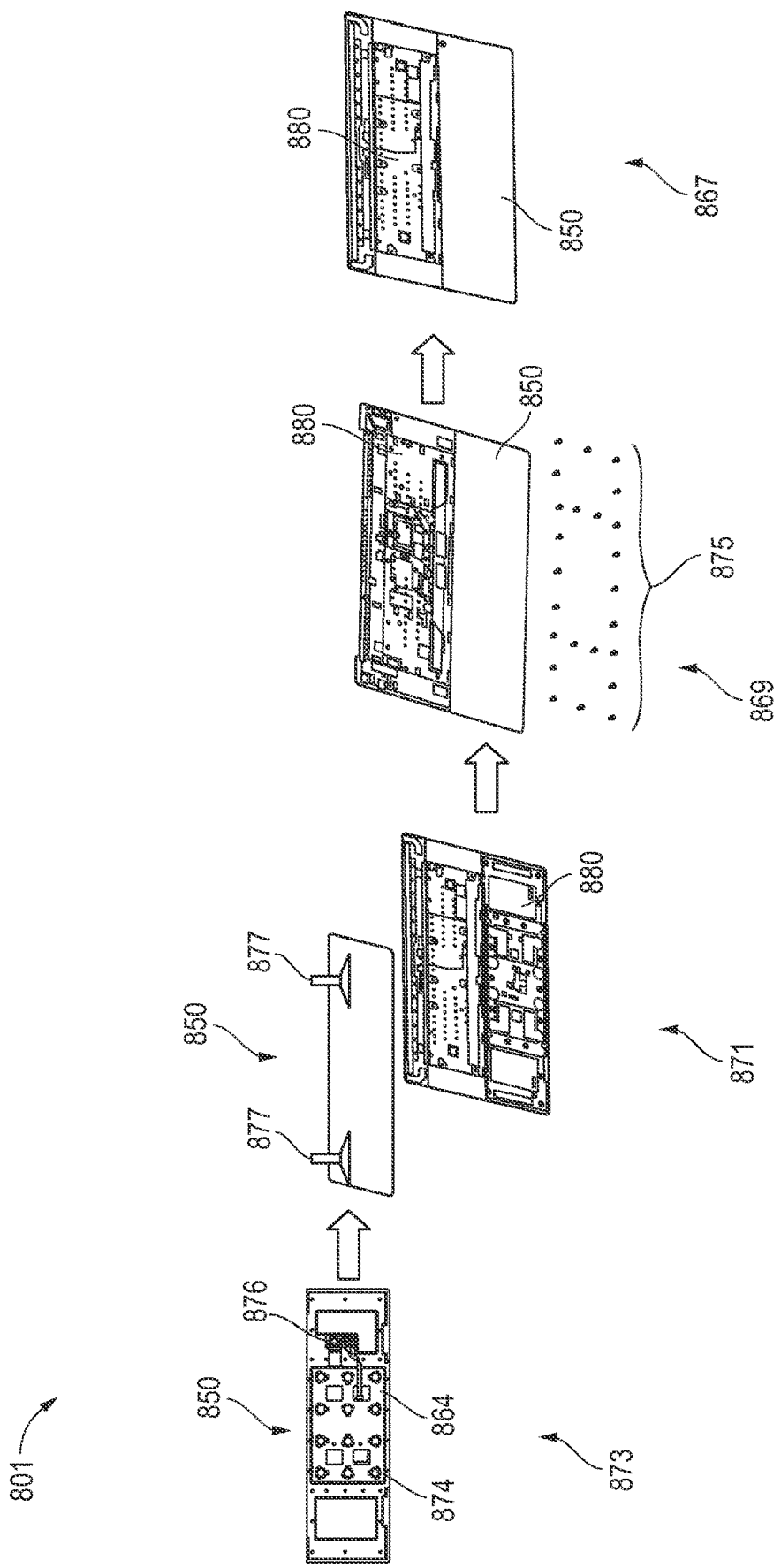
FIG. 8 is a graphical diagram illustrating an assembly process of a modular seamless haptic touchpad assembly into a chassis of an information handling system according to an embodiment of the present disclosure.

FIG. 8 is a graphical diagram illustrating an assembly process 801 of a modular seamless haptic touchpad assembly 850 into a chassis of an information handling system 800 according to an embodiment of the present disclosure. FIG. 8 shows an assembled modular seamless haptic touchpad assembly 850. In the example embodiment shown in FIG. 8, a piezoelectric device-actuated modular seamless haptic touchpad assembly 850 that includes a haptic actuator array that includes a plurality of piezoelectric device 874 in a haptic actuator array is shown. It is understood that the assembly process 801 of FIG. 8 may be applied equally to any modular seamless haptic touchpad assembly 850 into a chassis of an information handling system 800 and the uniform dimension provides for ease of installation of any type and removal as needed. The touchpad support bracket 864 has been coupled to the remaining layers and devices of the modular seamless haptic touchpad assembly 850 via an adhesive as described herein. The underside of the modular seamless haptic touchpad assembly 850 is shown to also depict the haptic PCB 876 that interface with the hardware processor of the information handling system, via a connector, when installed in the top cover of the base chassis 880.

It is appreciated that, due to modularity of the modular seamless haptic touchpad assembly 850, the inductive coil-actuated modular seamless haptic touchpad assembly (e.g., FIG. 5, 550) described in FIG. 5 may also be automatically assembled into the top cover of the base chassis 880 of an information handling system. Indeed, because these modular seamless haptic touchpad assemblies 850 are modular, a manufacturer may receive customized purchase orders from one or more customers such that they can select between these two types of modular seamless haptic touchpad assemblies 850 and the manufacturer may selectively insert or assemble the appropriate modular seamless haptic touchpad assembly 850 into the top cover of the base chassis 880 of the information handling system. Still further, the modularity of the modular seamless haptic touchpad assemblies 850 described herein allows the manufacturer to test, via the connector, the operation of these types of modular seamless haptic touchpad assemblies 850 prior to assembly into the top cover of the base chassis 880 as described herein.

The assembly process 801 may include, at a first step 873, presenting the appropriate modular seamless haptic touchpad assembly 850 into the assembly line at the manufacture's assembly location. At a second step 871, one or more automated suction cups 877 may lift the modular seamless haptic touchpad assembly 850 into position and place the modular seamless haptic touchpad assembly 850. Other forms of handling and installing the modular seamless haptic touchpad assembly 850 are also contemplated. The uniform dimension of the modular seamless touchpad assembly 850, including its touchpad support bracket 864 and seamless glass layer, forms the installable hardware module that may be handled and installed as shown.

At a third step 869 the modular seamless haptic touchpad assembly 850 may be secured to the top cover of the base chassis 880 using a plurality of fasteners 875. In the embodiments described herein, these fasteners 875 may include a screw, a bolt, interference fit post or other structure, a clipping device, or other type of fastener. The fasteners 875 may be inserted into a plurality of fastener vias formed through the top cover of the base chassis 880 and pass into matching via formed through the touchpad support bracket 864 such that the fasteners 875 may pass through a bottom surface of the top cover of the base chassis 880 and into the touchpad support bracket 864 such that the touchpad support bracket 864 and the modular seamless haptic touchpad assembly 850 as a modular unit installable hardware module is secured to the top cover of the base chassis 880 of the information handling system. At a fourth step 867, the assembled modular seamless haptic touchpad assembly 850 and base chassis 880 may proceed further down the assembly line so that other components such as a keyboard and a video display device may be coupled to the information handling system to form, in the example embodiment shown in FIG. 8, a completed laptop-type information handling system. In other embodiments, these other components may have been installed prior to installation of the modular seamless haptic touchpad assembly 850 into the chassis of an information handling system 800. Any order of installation of the components including the modular seamless haptic touchpad assembly 850 into a chassis of an information handling system 800 is contemplated.

Figure 9:
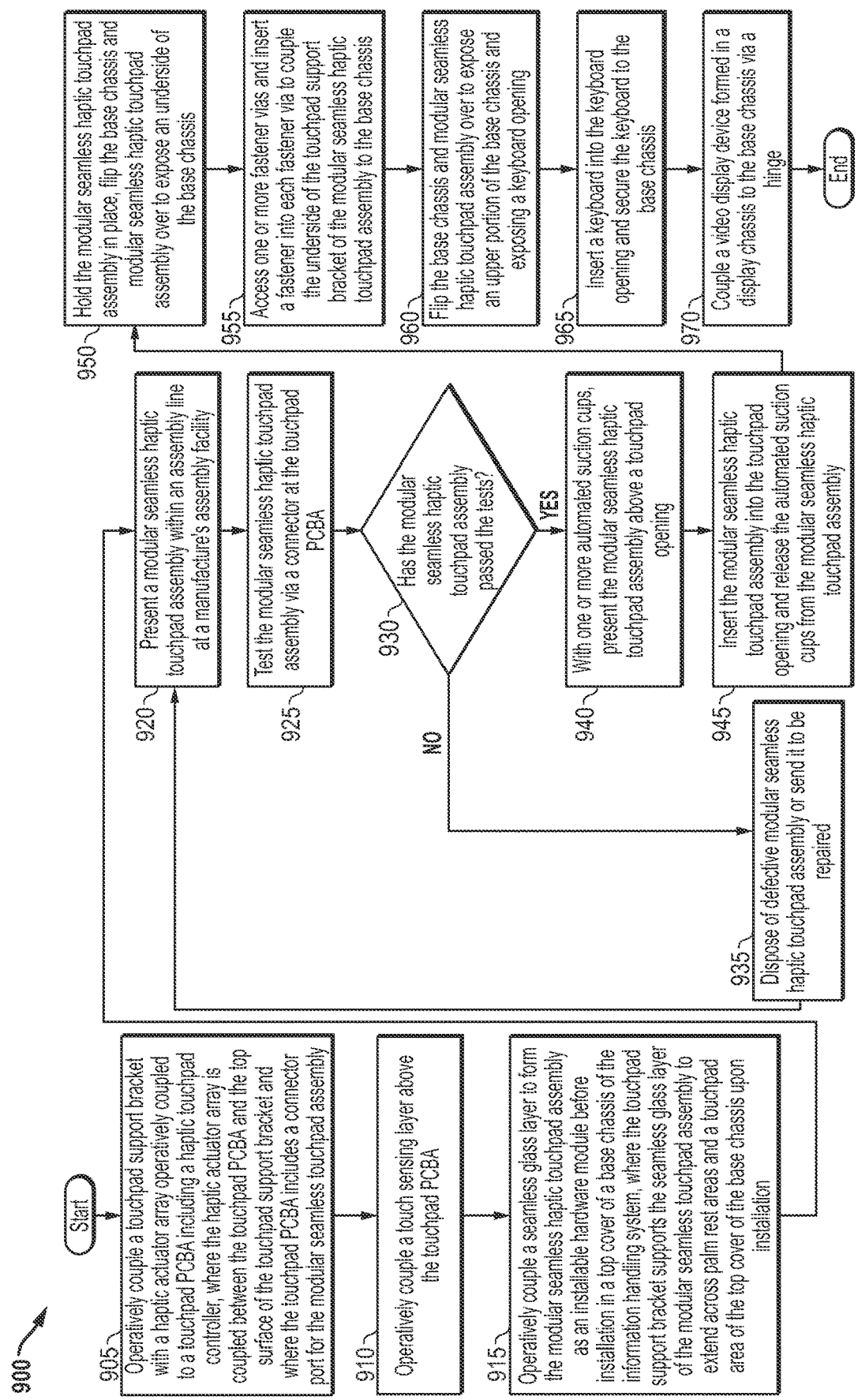
FIG. 9 is a flow diagram illustrating a method of assembling a modular seamless haptic touchpad assembly for an information handling system according to an embodiment of the present disclosure.

FIG. 9 is a flow diagram illustrating a method 900 of assembling a modular seamless haptic touchpad assembly for an information handling system according to an embodiment of the present disclosure. The method 900 may begin with the manufacturing of the modular seamless haptic touchpad assembly as described herein. For example, at block 905, the method 900 includes operatively coupling a touchpad support bracket with a haptic actuator array operatively coupled to a touchpad PCBA including a haptic touchpad controller. In an embodiment, the haptic actuator array is coupled between the touchpad PCBA and the top surface of the touchpad support bracket and where the touchpad PCBA includes a connector port for the modular seamless touchpad assembly. As described herein, the assembly of the modular seamless haptic touchpad assembly may follow similar steps described in connection with FIGS. 2-4 that describes the manufacturing of a piezoelectric device-actuated modular seamless haptic touchpad assembly includes a haptic actuator array that includes a plurality of piezoelectric devices. Further, according to another example embodiment, the assembly of the modular seamless haptic touchpad assembly may follow similar steps described in connection with FIGS. 5-7 that describes the manufacturing of an inductive coil-actuated modular seamless haptic touchpad assembly that includes an array of inductive coils formed on a bottom surface of the touchpad PCBA that interact, magnetically, with an array of magnets operatively coupled to a top surface of the touchpad support bracket. It is contemplated that manufacturing of these different type of modular seamless haptic touchpad assemblies could further include the arrangement of multiple different and additional devices with the modular seamless haptic touchpad assembly of embodiments herein.

At block 910, the method 900 includes operatively coupling a touch sensing layer above the touchpad PCBA. The touch sensing layer may be adhesively coupled to a bottom surface of a seamless glass layer within the modular seamless haptic touchpad assembly. The touch sensing layer, in an embodiment, may be a capacitive touch sensing layer that detects a user's touch at and through the seamless glass layer so that the user may interact with the information handling system. In an embodiment, the size of the touch sensing layer may define an interactive area of the modular seamless haptic touchpad assembly where the user may provide input to the information handling system. Operatively coupling may be via an adhesive or via form fitting, fastener, or the like in various embodiments.

The method further includes, at block 915, operatively coupling a seamless glass layer to the top of the modular seamless haptic touchpad assembly to form the modular seamless haptic touchpad assemblies described herein. The modular seamless haptic touchpad assembly serves as an installable hardware module before installation within a top cover of a base chassis of the information handling system. In an embodiment, the touchpad support bracket supports the seamless glass layer of the modular seamless touchpad assembly and extend across palm rest areas and a touchpad area of the top cover of the base chassis upon installation. Again, operatively coupling may be via an adhesive or via form fitting, fastener, or the like in various embodiments.

At block 920, the appropriate modular seamless haptic touchpad assembly is presented into the assembly line at the manufacturer's assembly location as an installable hardware module. Again, as described herein, the manufacturer may receive customized orders that require the manufacturer to build an information handling system that includes one of the piezoelectric device-actuated modular seamless haptic touchpad assembly or the inductive coil-actuated modular seamless haptic touchpad assembly described herein. Thus, the modularity of the modular seamless haptic touchpad assembly described herein allows for the manufacturer to introduce the appropriate modular seamless haptic touchpad assembly into the assembly line based on the customer's customization of the information handling system according to an order placed.

At block 925, the modular seamless haptic touchpad assembly is tested. Again, each type of modular seamless haptic touchpad assembly may include a connector used to operatively couple the modular seamless haptic touchpad assembly to a processing device of the information handling system. This connector may be used by the manufacturer to couple the modular seamless haptic touchpad assembly to a testing unit (e.g., a testing computing device) for the modular seamless haptic touchpad assembly to be tested prior to installation into a top cover of the base chassis. The coupling of the connector to the testing unit may be done automatically or by a testing technician.

At block 925, the method 900 includes a determination whether the modular seamless haptic touchpad assembly has passed the operational test. Where the modular seamless haptic touchpad assembly has not passed this test, the method 900 continue to block 935 with the manufacturer disposing of the defective modular seamless haptic touchpad assembly or sending the defective modular seamless haptic touchpad assembly to be repaired. The method 900 then returns to block 920 with a new modular seamless haptic touchpad assembly being introduced into the assembly line for testing and installation where appropriate.

Where the modular seamless haptic touchpad assembly has passed the diagnostic tests at block 930, the method includes, with one or more automated suction cups, presenting the modular seamless haptic touchpad assembly as an installable hardware module above a touchpad opening formed in the top cover of the base chassis at block 940. The automated suction cups may suction onto the seamless glass layer and lift the modular seamless haptic touchpad assembly over the touchpad opening and placed into the same. The uniform dimension of the seamless haptic touchpad assembly from any vendor source or any type of haptic actuator type, may allow the installable hardware module of any specific type to be modularly installed in the touchpad opening.

At block 945, the modular seamless haptic touchpad assembly is inserted into the touchpad opening and the automated suction cups are released from the modular seamless haptic touchpad assembly. This releases the modular seamless haptic touchpad assembly into the touchpad opening where the modular seamless haptic touchpad assembly is to be placed within the chassis of the information handling system.

The method 900 further includes, at block 950, holding the modular seamless haptic touchpad assembly in place and flip the base chassis and modular seamless haptic touchpad assembly over to expose an underside of the base chassis. This allows the automated system to, at block 955, access one or more fastener vias and insert a fastener into each fastener via to couple the underside of the touchpad support bracket of the modular seamless haptic touchpad assembly to the base chassis. In an embodiment, these fasteners may include a screw, a bolt, an interference fit post or other structure, a clipping device, or other type of fastener. The fastener vias each match a via formed through the touchpad support bracket such that the fasteners may pass through a bottom surface of the top cover of the base chassis and into the touchpad support bracket such that the touchpad support bracket and the modular seamless haptic touchpad assembly as a modular unit is secured to the top cover of the base chassis of the information handling system.

At block 960, the base chassis and modular seamless haptic touchpad assembly is flipped over to expose an upper portion of the base chassis and exposing a keyboard opening. At block 965, a keyboard is inserted into the keyboard opening and secured to the base chassis as well. At this point the base chassis may be completed, and a video display device may be coupled to the base chassis. In an embodiment, at block 970, a video display device is formed in a display chassis and the display chassis is coupled to the base chassis via a hinge. This forms the laptop-type information handling system and the method 900 may end with the completed information handling system being packaged and shipped out to the customer.

The blocks of the flow diagram of FIGS. 8 and 9 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A modular seamless haptic touchpad assembly for an information handling system comprising:
    a seamless glass layer forming a top layer of a touchpad and extending to a plurality of palm rest support surfaces formed over a touchpad support bracket to extend across a top cover of a base chassis when installed in the information handling system;
    a touch sensing layer adhesively coupled to a bottom surface of the seamless glass layer;
    a touchpad printed circuit board assembly (PCBA) operatively coupled to a bottom surface of the touch sensing layer;
    a haptic actuator array coupled between a bottom surface of the PCBA and the touchpad support bracket for generating haptic user feedback to a user of the touchpad; and
    the touchpad support bracket formed under the haptic actuator array to support the modular seamless haptic touchpad assembly as an installable hardware module, the touchpad support bracket formed to modularly fit within a touchpad opening formed in the top cover of the base chassis of the information handling system; and
    a connector port to operatively couple a haptic touchpad controller with a reciprocal connector in the touchpad opening formed in the top cover of the base chassis and the modular seamless touchpad assembly is testable as the installable hardware module via the connector port before installation in the top cover of the base chassis;
    wherein the touchpad support bracket is mechanically and operatively couplable within the base chassis of the information handling system via fasteners disposed through the base chassis of the information handling system and into receiver openings along the sides of the touchpads support bracket.

2. The modular seamless haptic touchpad assembly of claim 1 further comprising:
    the touch sensing layer being a capacitive sensor array sensing capacitive touch in the touchpad assembly underneath the seamless glass layer and operatively coupled to the haptic touchpad controller to control actuation of a haptic device in the haptic actuator array.

3. The modular seamless haptic touchpad assembly of claim 1 further comprising:
    the haptic actuator array including an array of piezoelectric haptic devices mounted on holes in the touchpad support bracket under a touchpad zone of the seamless touchpad assembly for generating the haptic user feedback and operatively coupled to the touchpad PCBA to sense actuation by a user at the touchpad zone on the seamless glass layer forming the top layer of the touchpad.

4. The modular seamless haptic touchpad assembly of claim 1 further comprising:

the haptic actuator array including an array of inductive coils formed in the touchpad PCBA that interface with an array of magnets and mounted to a top surface of the touchpad support bracket to generate the haptic user feedback at the seamless glass layer forming the top layer of the touchpad when a current is applied to the array of inductive coils interfacing with the array of magnets.

5. The modular seamless haptic touchpad assembly of claim 1 further comprising:
the touchpad PCBA including a flexible PCBA for the haptic feedback to pass through the flexible PCBA and into the seamless glass layer, the touchpad PCBA including the haptic touchpad controller to control a current passed to the haptic actuator array to generate the haptic user feedback with at least one haptic actuator.

6. The modular seamless haptic touchpad assembly of claim 5 further comprising:
a plurality of silicone spacers on the touchpad support bracket to provide for an interaction space between the array of magnets operatively coupled to the array of inductive coils.

7. The modular seamless haptic touchpad assembly of claim 1 further comprising:
an adhesive layer to adhesively couple the seamless glass layer to the touchpad support bracket and the touchpad PCBA forming the installable hardware module, where the modular seamless touchpad assembly is of a uniform dimension for the touchpad opening and accommodates a plurality of types of the haptic actuator array.

8. A method of assembling a modular seamless haptic touchpad assembly for an information handling system comprising:
operatively coupling a touchpad support bracket with a haptic actuator array operatively coupled to a touchpad printed circuit board assembly (PCBA) including a haptic touchpad controller, where the haptic actuator array is coupled between the touchpad PCBA and the top surface of the touchpad support bracket and where the touchpad PCBA includes a connector port for the modular seamless touchpad assembly;
operatively coupling a touch sensing layer above the touchpad PCBA; and
operatively coupling a seamless glass layer to form the modular seamless haptic touchpad assembly as an installable hardware module that is testable before installation in a top cover of a base chassis of the information handling system, where the touchpad support bracket supports the seamless glass layer of the modular seamless touchpad assembly to extend across palm rest areas and a touchpad area of the top cover of the base chassis upon installation;
installing the modular seamless haptic touchpad assembly as the installable hardware module in the top cover of the base chassis of the information handling system by operatively coupling the touchpad support bracket of the modular seamless haptic touchpad assembly to the palm rest support surfaces of the base chassis via fasteners inserted through the base chassis and into openings disposed through sides of the touchpad support bracket; and
communicatively coupling the haptic touchpad controller to a processor of the information handling system.

9. The method of claim 8 further comprising:
installing the modular seamless touchpad assembly as the installable hardware module includes aligning the seamless glass layer such that a front edge of the seamless glass layer defines a front portion of a user-facing boundary of the top cover of the base chassis and such that a rear edge of the seamless glass layer defines an edge of a portion of a keyboard opening within the top cover of the base chassis, and where the seamless glass layer includes a touchpad interface surface and a plurality of palm rest surfaces extending to side edges of the base chassis.

10. The method of claim 9, wherein the touchpad PCBA including a flexible PCBA for haptic feedback to pass through the flexible PCBA and into the seamless glass layer, the flexible PCBA including the haptic touchpad controller to control a current passed to the array of haptic actuators.

11. The method of claim 9 further comprising:
installing the modular seamless touchpad assembly as the installable hardware module to modularly fit within a touchpad opening formed in the top cover of the base chassis of the information handling system; and
operatively coupling the connector port of the modular seamless touchpad assembly with a reciprocal connector in the touchpad opening formed in the top cover of the base chassis.

12. The method of claim 8 further comprising:
the haptic actuator array including an array of piezoelectric haptic devices for haptic user feedback disposed between the touchpad PCBA and across holes formed into the touchpad support bracket in the modular seamless touchpad assembly.

13. The method of claim 8 further comprising:
the haptic actuator array including an array of inductive coils formed in the touchpad PCBA to interface magnetically with an array of magnets operatively coupled to a top surface of the touchpad support bracket to create haptic user feedback at the seamless glass layer when a current is applied to the array of inductive coils.

14. The method of claim 8 further comprising:
applying an adhesive layer to adhesively couple the seamless glass layer to the touchpad support bracket and the touchpad PCBA to form the installable hardware module, where the modular seamless touchpad assembly is of a uniform dimension for the touchpad opening in the top cover of the base chassis and accommodates a plurality of types of the haptic actuator array for installation in the information handling system.

15. A modular seamless haptic touchpad assembly comprising:
a seamless glass layer supported across its width by a support bracket and forming a top layer of a touchpad and extending to a plurality of palm rest surfaces formed on a top cover of a base chassis of an information handling system, where the seamless glass layer forms a single surface extending from a front portion of a user-facing boundary of the top cover of the base chassis to a rear edge of the seamless glass layer defining an edge for a keyboard opening in the top cover of the base chassis when the module seamless touchpad is installed in a touchpad opening of the top cover of the base chassis;
a capacitive touch sensing layer adhesively coupled to a bottom surface of the seamless glass layer to detect touch from a user through the seamless glass layer;
a touchpad printed circuit board assembly (PCBA) operatively coupled to a bottom surface of the touch sensing layer comprising a haptic touchpad controller operatively coupled to the capacitive touch sensing layer;

a haptic actuator array operatively coupled to a bottom surface of the touchpad PCBA between the touchpad PCBA and the touchpad support bracket and operatively coupled to the haptic touchpad controller to control haptic user feedback; and the touchpad support bracket operatively coupled under the haptic actuator layer and the seamless glass seamless glass layer, including the plurality of palm rest surfaces, to form the modular seamless haptic touchpad assembly, the touchpad support bracket formed to fit within the touchpad opening formed within the base chassis, wherein the touchpad support bracket is mechanically and operatively couplable to the base chassis of the information handling system via fasteners disposed through the base chassis of the information handling system and into openings along the sides of the touchpad support bracket.

16. The modular seamless haptic touchpad assembly of claim 15 further comprising:

the haptic actuator array including an array of piezoelectric haptic devices for generating the haptic user feedback disposed between the touchpad PCBA and on the touchpad support bracket in the modular seamless touchpad assembly.

17. The modular seamless haptic touchpad assembly of claim 15 further comprising:

the haptic actuator array including an array of inductive coils formed in the touchpad PCBA to interface magnetically with an array of magnets mounted to a top surface of the touchpad support bracket to generate the haptic user feedback at the seamless glass layer when a current is applied to the array of inductive coils.

18. The modular seamless haptic touchpad assembly of claim 17 further comprising:

the touchpad PCBA including a flexible PCBA for the haptic feedback to pass through the flexible PCBA and into the seamless glass layer, the touchpad PCBA including a haptic controller to control a current passed to the array of inductive coils within the inductive coil layer.

19. The modular seamless haptic touchpad assembly of claim 17 further comprising:

a connector port to operatively couple a haptic touchpad controller with a reciprocal connector in the touchpad opening formed in the top cover of the base chassis such that the modular seamless touchpad assembly is testable via the connector port before installation in the top cover of the base chassis.

20. The modular seamless haptic touchpad assembly of claim 15, further comprising:

an adhesive layer to adhesively couple the seamless glass layer to the touchpad support bracket and the touchpad PCBA, where the modular seamless touchpad assembly is of a uniform dimension for the touchpad opening in the top cover of the base chassis and accommodates a plurality of types of the haptic actuator array for installation in the information handling system.

* * * * *